United States Patent [19]
Nakajima

[11] 3,877,483
[45] Apr. 15, 1975

[54] SOLENOID OPERATED FOUR PORT VALVE
[75] Inventor: Hiroyuki Nakajima, Ashiya, Japan
[73] Assignee: Konan Electric Co., Ltd., Nishinomiya-shi, Hyogo, Japan
[22] Filed: May 10, 1974
[21] Appl. No.: 468,720

[52] U.S. Cl. .......................................... 137/625.64
[51] Int. Cl. .......................................... F15b 13/043
[58] Field of Search ...... 137/625.6, 625.64; 251/30, 251/31

[56] References Cited
UNITED STATES PATENTS
2,616,449  11/1952  Maha .................................... 251/30
2,916,051  12/1959  Taylor .............................. 137/625.64

*Primary Examiner*—Alan Cohan
*Assistant Examiner*—Gerald A. Michalsky
*Attorney, Agent, or Firm*—Sughrue, Rothwell, Mion, Zinn and Macpeak

[57] ABSTRACT

In a four port valve comprising a piston operable in the body of the valve, a valve seat member having slots, a slidable valve member driven by the piston in co-operation with the valave seat member for connecting an inlet port and an exhaust port to either of two outlet ports, respectively, and a pilot solenoid operated three port valve for controlling a pressurized fluid supplied to a chamber on one side of the piston; a groove is further provided in the slidable valve member in communication with a recessed portion formed therein, first and second pilot holes are provided through the valve seat member, and the relative positions and the dimensions of the groove, pilot holes, and an edge of the slidable valve member are so selected that a transferring action in the connection of a chamber on the other side of the piston occurs at a later part of the period for transferring connection to the inlet port and the outlet port between the two outlet ports.

8 Claims, 8 Drawing Figures

SOLENOID OPERATED FOUR PORT VALVE

BACKGROUND OF THE INVENTION

This invention relates generally to four port valves, and more particularly to an improved solenoid operated four port pneumatic valve.

Solenoid operated port pneumatic valves have been widely used in various automatic controlled machines for controlling pneumatic piston-cylinder devices for driving the machines. The functions attained by the four port pneumatic valves are so important that the life and reliability of the automatic machines themselves greatly depend upon the construction and quality of the four port pneumatic valves, and hence the four port valves of a long operational life and high reliability are urgently required. Furthermore, the four port pneumatic valves are preferably of light weight and small size.

Among various devices heretofore proposed, a change-over valve disclosed in Japanese Pat. publication No. 10748/1972 has a construction wherein the pressurized fluid is passed into a common space (corresponding to a piston chamber in a device of this invention) simultaneously with the changing-over action of a valve body (corresponding to a sliding valve member in this invention) between an inlet port, outlet port, delivering port, and a main port of the valve. Accordingly, the change-over valve is accompanied with a drawback that the valve body terminates its movement before the change-over action of the fluid through the main port has not yet been completed. As a result, the change-over valve cannot supply a sufficient quantity of the operating fluid as designed initially.

In another example of the four port valve, the cross-sectional area of one end of a piston, for instance, the right end thereof has been made twice greater than that of the left end, and a constant fluid pressure has been applied to the left-side piston chamber. However, the above described construction of the conventional four port change-over valve suffers from two disadvantages, one being the enlargement of the piston which in turn enlarges the size of the four port valve in its entirety, and the other being the requirement of a considerable time period for supplying the pressurized fluid into the right side piston chamber of a considerably large space from a pilot three port valve provided therewith, thus requiring a long operational time period for changing over the fluid from the main port.

In still another example of the conventional four port change-over valve, a spring is provided in a piston chamber at, for instance, the left side thereof thereby to urge the piston toward the right, and the right side chamber of the piston is used for receiving and delivering the fluid supplied by the pilot solenoid operated three port valve. However, in the example of the above described construction, the spring force tends to be different between compression and extension, and hence the cross-sectional area of the piston at the right side thereof should be made sufficiently great so that a sufficient force is allowed to be applied to the piston even at the time when a weak extension force of the spring is being applied to the piston, and that the piston can be shifted leftwardly by overcoming the strong compressive force of the piston. Thus, the size of the entire valve body increases, and if one tries to minimize the size, the reliability of the four port valve is reduced.

SUMMARY OF THE INVENTION

With all of the above described drawbacks of the conventional four port change-over valves in view, a primary object of the present invention is to provide an improved solenoid operated four port valve where the size is substantially minimized and the reliability thereof is much improved.

Another object of the invention is to provide an improved four port solenoid operated valve wherein the cross-sectional areas on both sides of the piston can be minimized, and the change-over period thereof is substantially shortened.

Still another object of the invention is to provide an improved solenoid operated four port valve wherein the required number of parts can be remarkably reduced, and the production cost thereof is substantially lowered.

A further object of the invention is to provide an improved solenoid operated four port valve which permits the use of ceramics or other high wear-resistant materials for the important parts of the valve so that the operational life thereof is substantially elongated.

With these objects in view and other objects hereinafter made apparent, this invention provides, in an improved solenoid operated four port valve comprising a piston operable in a main body, a slidable valve member operated by the piston for connecting an inlet port and an exhaust port to either of outlet ports A and B of the valve respectively, and a pilot solenoid operated three port valve coupled with the main body for controlling a pressurized fluid supplied through the inlet port to one side chamber of the piston; the improvement comprising a small groove provided in the slidable valve member in communication with a recess formed therein, a first pilot hole and a second pilot hole provided through a valve seat member for supplying a part of the pressurized fluid to a chamber on the opposite side of the piston under a transferring action of the small groove and an edge of the slidable valve member, the relative positions and the measurements of the small groove, the first and second pilot holes, and the edge of the slidable valve member being so selected that the transferring action of the pressurized fluid to the opposite side chamber of the piston occurs at a later part of the time period during which the connection of the exhausting port of the valve from outlet port A to outlet port B is transferred.

The invention will now be described by way of example with reference to the accompanying drawing in which like parts are designated by like reference numerals.

DETAILED DESCRIPTION OF THE INVENTION

Figure 1:
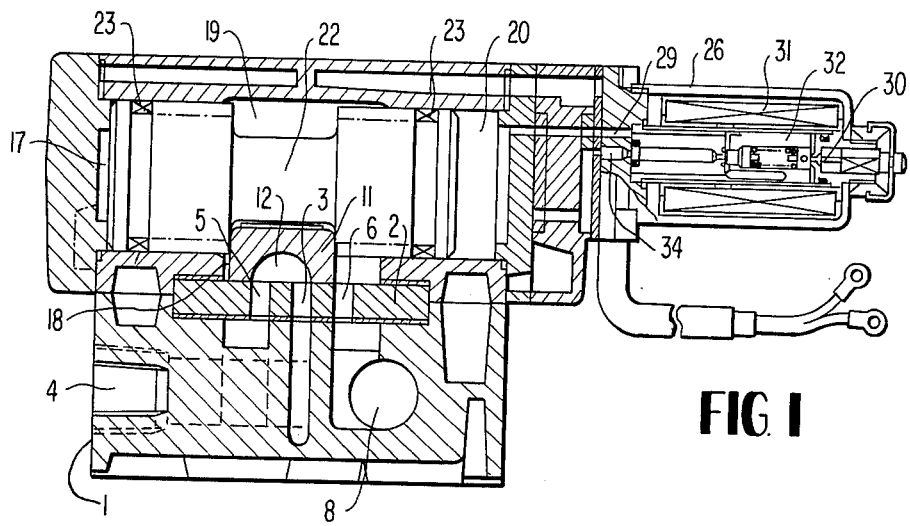
FIG. 1 is a longitudinal sectional view of an example of the solenoid operated four port valve according to the present invention.
Figure 2:
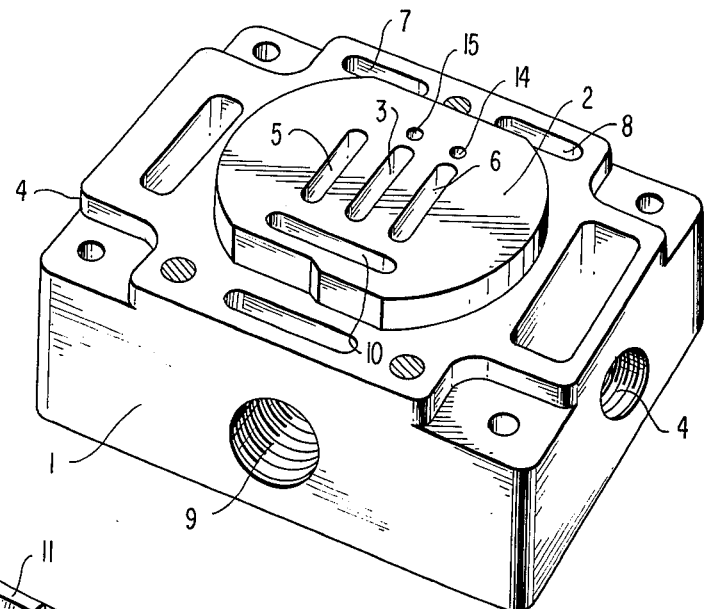
FIG. 2 is a perspective view of a valve seat member and a subplate both included in the example of the solenoid operated four port valve in an integrally combined manner.
Figure 3:
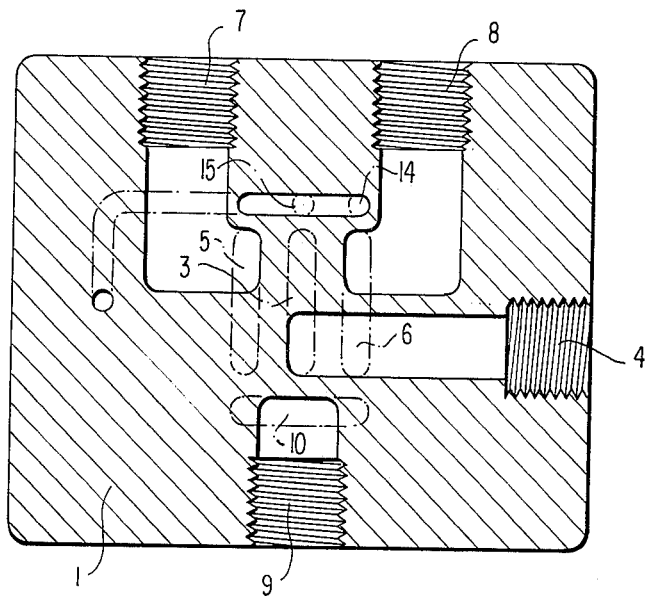
FIG. 3 is a sectional view of the subplate.

Referring now to FIGS. 1, 2, and 3, the example of the solenoid operated four port valve according to the present invention comprises a subplate 1 and a valve seat member 2 securely combined together with the valve seat member 2 overlying the subplate 1. Through the valve seat member, there is provided a delivery slot 3 of an elongated rectangular configuration at the center of the seat member 2. The delivery slot 3 is communicated with an exhaust port 4 provided in one side surface of the subplate 1 as best illustrated in FIG. 3.

On both sides of the delivery slot 3 of the valve seat member 2, an outlet slot A 5 and another outlet slot B 6 of the same configuration as that of the outlet slot 3 are provided. The two outlet slots 5 and 6 are communicated with an outlet port A 7 and another outlet port B 8 provided in another side surface of the subplate 1 as designated at 7 and 8, respectively. These outlet ports 7 and 8 may be connected through respective pipe lines to two chambers in a cylinder on the opposite sides of a piston of, for instance, a pneumatic machine.

On still another side of the subplate 1, there is provided an inlet port 9 as best illustrated in FIGS. 2 and 3. The inlet port 9 is communicated with a slot 10 provided through the valve seat member 2 on a lateral side of the three aligning slots 3, 5, and 6. The inlet port 9 may be connected to a pressurized fluid source such as a compressed air source.

Figure 5:
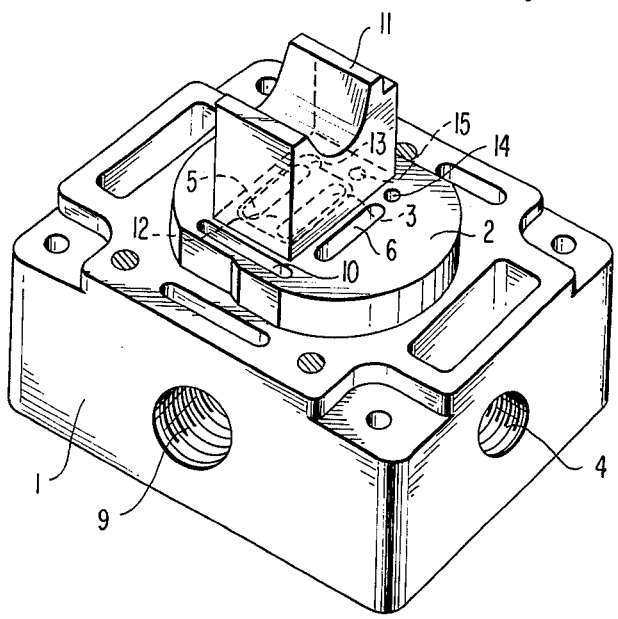
FIG. 5 is a perspective view of the subplate, the valve seat member, and the slidable valve member assembled in this order.

Although the four slots 3, 5, 6, and 10 communicated as described above with four ports 4, 7, 8, and 9, respectively, form four kinds of passages having these slots and ports at their ends, any leakage between these separate passages is prevented throughout the subplate 1, valve seat member 2, and the contacting surfaces between these two members. On the upper surface of the valve seat member 2, a slidable valve member 11 is provided as best illustrated in FIG. 5 so that the latter can slide along the surface of the valve seat member 2.

Figure 4:
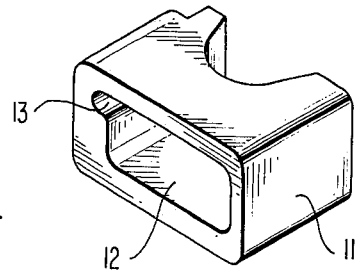
FIG. 4 is a perspective view of a slidable valve member of this example.

As is apparent in FIG. 4, the slidable valve member 11 has a recessed portion 12 of a considerably large size at the center thereof in the surface contacting the valve seat member 2. The slidable valve member 11 is further provided with a small groove 13 at one corner of the substantially rectangular recessed portion 12 so that the groove 13 is communicated throughout the length thereof with the recessed portion 12. The size of the substantially rectangular recessed portion 12 in terms of axial length is so selected that it can overlie the delivery slot 3 and the outlet slot 5, or the deliver slot 3 and the other outlet slot 6. Furthermore, it should be noted that both of the outlet slots 5 and 6 are located at symmetrical positions with respect to the delivery slot 3.

Through the valve seat member 2, there are further provided two pilot holes A 14 and B 15 in alignment with the delivery slot 3 and an outlet slot B6 on the opposite side thereof against the slot 10 as best illustrated in FIGS. 2 and 3. The locations of the pilot holes 14 and 15 are further selected in such a manner that the small groove 13 of the slidable valve member 11 can cover one of the pilot holes when the slidable valve member 11 is at one end of its operating stroke, and that a sufficient distance for preventing leakage of the pressurized fluid can be maintained between the pilot hole A 14 and the slot B 6 or between the pilot hole B 15 and the slot 3.

Figure 6:
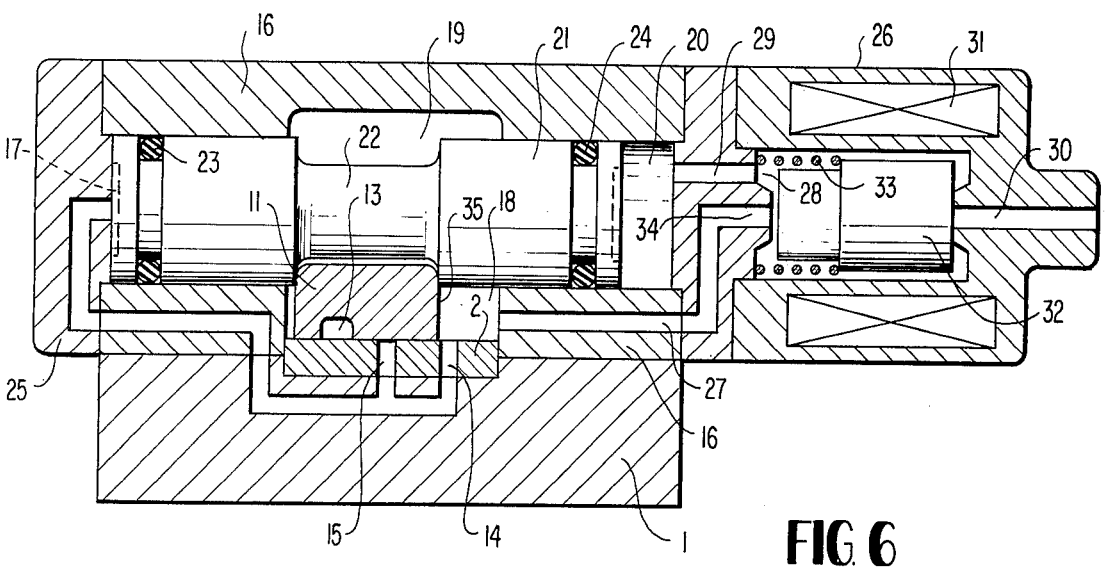
FIG. 6 is a somewhat schematic sectional view of the solenoid operated four port valve according to this invention in a state wherein the electromagnetic coil is not energized.

The pilot holes 14 and 15 are communicated with each other in the subplate 1 as best illustrated in FIG. 6, and the passage is thereafter extended through the main body 16 to a chamber 17 at the left side of the piston as viewed in FIG. 6. The subplate 1 is coupled with the main body 16 in a fluid tight-fit manner. Within the main body 16, there are provided a valve space 18 and a piston chamber 19 as shown in FIGS. 1 and 6. In the piston chamber 19, a piston 21 is provided to be slidably operable, rightwardly or leftwardly. The diameter of the piston 21 is somewhat reduced at 22 at a lengthwisely intermediate part thereof.

The slidable valve member 11 is inserted in this reduced diameter portion 22 of the piston 21 so that the slidable valve member 11 is moved righwardly or leftwardly in accordance with the movement of the piston 21. Gaskets 23 and 24 are provided at both ends of the piston 21.

The left end of the main body 16 is covered by a cap member 25, and a solenoid operated three port pilot valve 26 of a comparatively small size is secured to the right side end of the main body 16. The solenoid operated three port pilot valve 26 may be any of the conventional types, and in the shown example, a solenoid operated three port pilot valve of packless type is used.

In the arrangement shown in FIG. 6, a passage 27 is provided through the main body 16 of the valve to communicatively connect the valve chamber 18 to an inlet port 34 of the three port valve 26. The inlet port 34 in communication with a chamber 28 including an armature 32 of the electromagnet, and the chamber 28 in turn is communicated with a piston chamber 20 provided at the right-hand side of the piston 21 through a passage 29. The chamber 28 is further communicated through an exhaust passage 30 with the outer atmosphere.

In the case where the electromagnetic coil 31 of this three port valve 26 is not yet energized, the armature 32 is urged rightwardly by means of a spring 33 also provided in the chamber 28, thereby to close the passage 30 leading to the outer atmosphere. The rightward movement of the armature 32 opens the inlet port 34 so that the pressurized fluid in the chamber 18 is introduced through the passage 27 and the inlet port 34 to the chamber 28 and then through the passage 29 to the right-hand side piston chamber 20. When the electromagnetic coil 31 is energized, the armature 32 is shifted leftwardly against the spring force of the spring 33, whereby the inlet port 34 is closed and the exhaust passage 30 is opened thus carrying out a three-port valve action.

Figure 7:
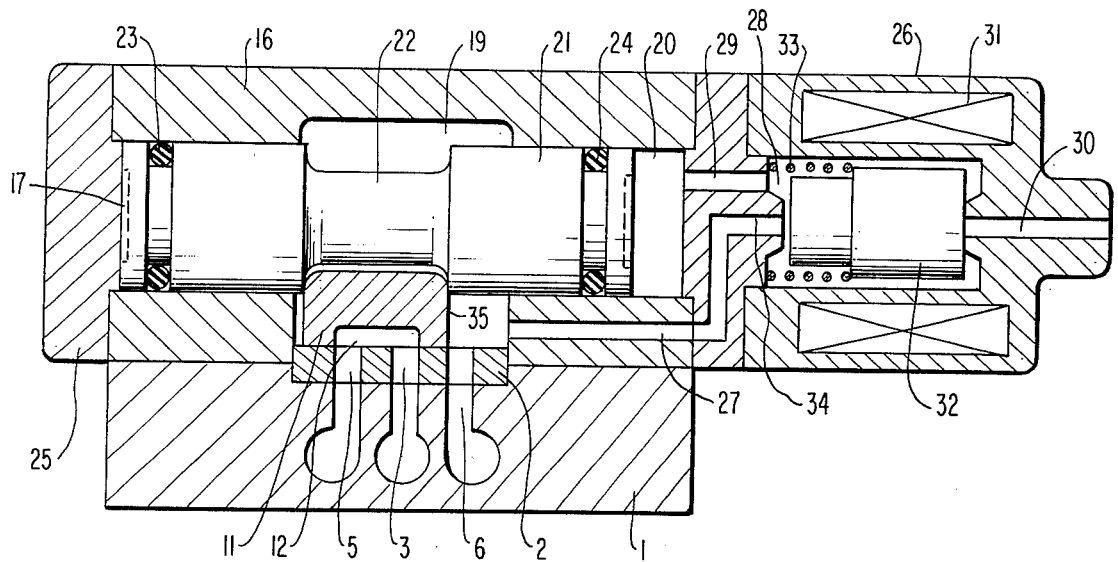
FIG. 7 is a schematic view of the solenoid operated four port valve in a state similar to FIG. 6, wherein the relation between two outlet ports A and B, an exhausting port, slidable valve member and a piston thereof is indicated more clearly.

In FIG. 6, there is indicated the state of the valve wherein the electromagnetic coil is not energized. In this state, the pressurized fluid introduced through the inlet port 9 is passed through the elongated slot 10 to the valve chamber 18 and then to the chamber 28. Since the armature 32 is at the rightmost position closing the passage 30 as described above, the pressurized fluid in the chamber 28 is passed through the passage 29 to the chamber 20 at the right-hand side of the piston 21, whereby the piston 21 is shifted leftwardly placing the slidable valve member 11 to a leftward position relative to the delivery slot 3 and the outlet slots A 5 and B 6 in the valve seat member 2. The pressurized fluid in the chamber 18 is thus delivered through the outlet slot B 6 and the outlet port B designated at 8 to, for instance, one side chamber of a pneumatic machine, and the other side chamber of the same machine is connected through the port A 7, the outlet slot A 5, the recessed portion 12 of the slidable valve member 11, the delivery slot 3, to the exhausting port 4. Since the exhausting port 4 is opening to the outer atmosphere, the fluid in the other side chamber of the pneumatic machine is exhausted through the above described path to the outer atmosphere. The state thus described and indicated in FIG. 7 therefore corresponds to one operational position of the four port valve of this invention.

In the later part of the leftward shifting of the piston 21, the pilot hole 14 in the valve seat member 2 is communicated with the chamber 18 due to the left ward movement of the slidable valve member 11 (the right side edge 35 of the valve member 11 opening the pilot hole A 14) whereby the pressurized fluid in the chamber 18 is partly delivered through the pilot hole 14 and the passage through the main body 16 to the chamber 17 at the left-hand side of the piston 21.

The diameter of the pilot hole A 14 is selected to be smaller than the width of the outlet slot B 6 in the valve seat member 2, and the relative positions of the pilot hole A 14 and the outlet slot B 6 with respect to the right side edge 35 of the slidable valve member 11 are so selected that the outlet slot B 6 is firstly opened to the chamber 18 and the pilot hole A 14 is then opened in the later part of the period during which the operation of the four port valve is changed over from the previous state to the above described state. The size of the slidable valve member 11 and the measurements of the recessed portion 12, delivery slot 3, outlet slots 5 and 6, as well as the positions thereof are also selected suitably so that the delivery of the pressurized fluid through the outlet B 6 and the outlet port B 8 and the exhaust of fluid through the outlet port 7, the outlet slot A 5, the delivery slot 3, to the exhaust port 4 occur simultaneously at a specific position of the slidable valve member 11.

As an example, the above described measurements and positions are selected such that assuming the width of the delivery slot 3 measured in the longitudinal direction (or sliding direction) of the slidable valve member 11 to be $b$, the widths of the outlet slots 5 and 6 are also $b$. Likewise, the widths of the portions of the valve seat member 2 between the delivery slot 3 and the outlet slots 5 and 6, respectively, are also selected to be $b$, the length of the recessed portion 12 of the slidable valve member 11 measured along the longitudinal direction to $3b$, and the length of the slidable valve member itself measured from one side outer edge to the other side outer edge is selected to be $5b$.

When the measurements and positions of the above described member and slots are so selected that, a four-port valve action can at first be caused between the delivery slot 3 and the outlet slots A 5 and B 6, and then a part of the pressurized fluid can pass through the pilot hole 14 to the leftward chamber 17 for the piston 21.

In FIG. 6, there is indicated the example of the solenoid operated four port valve in an operating state where the coil 31 is not energized. In this operational state, the piston 21 and the slidable valve member 11 are at their leftward positions wherein the flowing directions through the delivery slot 3, outlet slot A 5, and the other outlet slot B 6 are as described hereinbefore.

Figure 8:
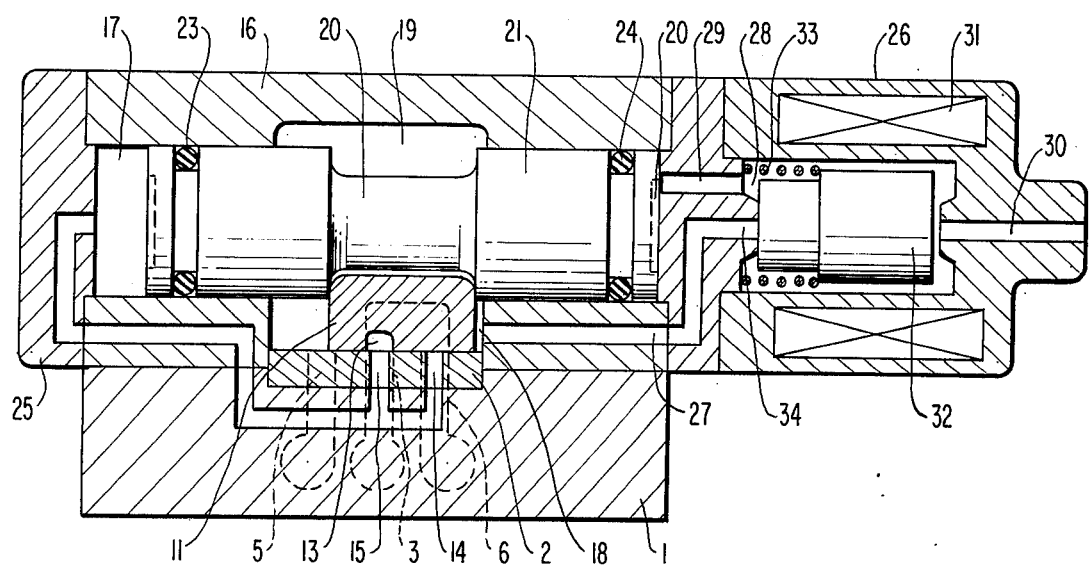
FIG. 8 is a schematic view similar to FIG. 7, but the electromagnetic coil is energized.

When the coil 31 is energized at this state, the armature 32 is shifted leftwardly against the force of the spring 33 as shown in FIG. 8 thereby opening the passage 30 and closing the inlet port 34 to the chamber 28. Thus, the fluid in the chamber B 20 on the right side of the piston 21 is exhausted through the passage 29, the chamber 28, and the passage 30, to the outer atmosphere.

In this state, the pressurized fluid is partly introduced through the pilot hole 14 to the chamber 17 on the left side of the piston 21 thereby urging the piston 21 toward right. Since the fluid in the chamber B 20 on the right side of the piston 21 has been communicated with the outer atmosphere, the piston 21 is moved together with the slidable valve member 11 to the right. The rightward movement of the slidable valve member 11 causes the valve chamber 18 filled with the pressurized fluid to communicate with the outlet port A 7 through the outlet slot 5 thereby delivering the pressurized fluid in the chamber 18 through the outlet port A 7 to one side chamber of, for instance, a pneumatic machine. Simultaneous therewith, the other outlet port B 8 connected to the other side chamber of the pneumatic machine starts to be communicated through the outlet slot 6, the recessed portion 13 of the slidable valve member 11, the delivery slot 3, and the exhaust port 4 with the outer atmosphere.

Along with the rightward progress of the slidable valve member 11, the pilot hole A 14 is closed by the right side edge 35 of the valve member 11 thus blocking further supply of the pressurized fluid into the chamber 17. However, the rightward movement of the piston 21 is continued regardless of this blocking of the supply of the pressurized fluid thereby further shifting the slidable valve member 11 rightwardly. The openings of the delivery slot 3 and the outlet slots 5 and 6 are thus further enlarged. At an instant short time before the slidable valve member 11 reaches the rightward end, the small groove 13 of the slidable valve member 11 begins to overlap the pilot hole B 15.

When the groove 13 overlaps the pilot hole B 15, the chamber 17 on the left side of the piston 21 communicates with the delivery slot 3 through the groove 3 (opening to the recessed portion 12), and then through the delivery port 4, the chamber 17 is communicated with the outer atmosphere. However, the piston 21 arrives at the rightward end position when the pressurized fluid in the chamber 17 is completely exhausted to the outer atmosphere (that is the pressure in the chamber 17 is equalized to that of the outer atmosphere), and the solenoid operated four port valve is now in the changed-over position opposite to the position described above. The four port valve in this position is indicated in FIG. 8.

When the erergization of the coil 31 ceases in this condition, the armature 32 is retracted toward the right by means of the spring 33 thereby closing the passage 30 and again introducing the pressureized fluid in the chamber 18 into the chamber B 20 on the right side of the piston 21 through the passage 27, chamber 28, and the passage 29. The piston 21 is thus moved toward the left. Since the chamber A 17 on the left side of the piston 21 is at this time still communicating with the outer atmosphere as described above, the start of the leftward movement of the piston 21 is facilitated. Along with the leftward movement of the piston 21, the transferring action of the outlet ports 7 and 8 is accomplished as described above, and at a later part of the leftward movement of the piston 21, a part of the pressurized fluid in the chamber 18 is introduced through the pilot hole A 14 to the chamber 17 on the left side of the piston. However, the leftward movement of the piston 21 has almost completed at this time, and the piston 21 stops at the leftward end position.

The above described operations are repeated each time the coil 31 is energized or de-energized, moving the piston 21 and the slidable valve member 11 rightwardly or leftwardly, whereby the solenoid operated four port valve transfers the pressurized fluid passing through the outlet ports 7 and 8.

The solenoid operated four port valve of the above described composition has the following characteristic features.

The delivery slot 3 and the outlet slots A 5 and B 6 in the valve seat member 2 are opened or closed under the transferring action of the slidable valve member 11 operated by the piston 21, and the piston 21 is in turn acted upon by a part of the pressurized fluid introduced into the chamber 17 on the left side of the piston 21 at a later period of the transferring action of the slidable valve member 11. Because of the above described feature, the cross sectional areas of the rightward and leftward ends of the piston 21 can be minimized to a value equalized between each other. More specifically, at the starting instant of the leftward movement of the piston 21, the chamber 17 on the left side of the piston 21 is communicated with the outer atmosphere for facilitating the leftward movement, and at a later part of the moving period thereof, a part of the pressurized fluid is introduced into the chamber 17 on the left side of the piston 21 under the action of the small groove 13 in the slidable valve member 11. The pressurized fluid thus introduced into the chamber 17 is confined therein until the piston 21 is moved toward the right, whereupon the pressurized fluid acts on the left side surface of the piston to move the same rightwardly while the chamber 20 at the right side of the piston 21 is communicated with the outer atmosphere. At a later part of the rightward movement of the piston 21, the pressurized fluid in the left side chamber 17 is again exhausted to the outer atmosphere thereby to place the piston 21 to be prepared for the subsequent movement to the left.

With the above described construction and arrangement of the solenoid operated four port valve according to the present invention, not only the cross-sectional areas of both ends of the piston 21 can be minimized and equalized to each other, but the rightward and leftward movements of the piston 21 can be far more assured than those in the conventional four port valves.

Furthermore, the solenoid operated valve according to this invention can be made of the parts the number of which is far less than that in the conventional four port valves, and since the parts such as the valve seat member and the slidable valve member within the reduced number of parts can be made of high wear resistant materials such as ceramics, the operational life and the reliability of the solenoid operated four port valve are far improved at a low production cost thereof.

What is claimed is:

1. In a solenoid operated four port valve comprising a piston operable in the main body of the four port valve, a fixed valve seat member, a slidable valve member operated by the piston and movable between first and second positions for connecting an inlet port and an exhaust port through said valve seat member to either of outlet ports A and B, respectively, and a solenoid operated three port pilot valve for controlling a pressurized fluid supplied through the inlet port to a chamber on one side of the piston; the improvement comprising a small groove provided in the slidable valve member in communication with a recessed portion formed therein, a first pilot hole and a second pilot hole extending through a valve seat member for supplying a part of the pressurized fluid to a chamber on the opposite side of the piston under a transferring action of the small groove and an edge of the slidable valve member, the relative positions and the dimensions of the small groove, the first and the second pilot holes, and the edge of the slidable valve member being so selected that the transferring action occurs in a later part of the time period during which the connection of the inlet port and the exhaust port is changed between the two outlet ports A and B.

2. A solenoid operated four port valve as set forth in claim 1 wherein said valve seat member has a delivery slot and two outlet slots in addition to said first and second pilot holes.

3. A solenoid operated four port valve as set forth in claim 2 wherein said one delivery slot and two outlet slots are of the same oblong configuration arranged in parallel with each other with the delivery slot located at the center and the outlet slots located on both sides of the delivery slot and all three slots extend at right angles to the sliding direction of said slidable valve member with a uniform space maintained therebetween.

4. A solenoid operated four port valve as set forth in claim 3 wherein said first and second pilot holes are arranged in lateral alignment with said delivery slot and one of said outlet slots at positions to be overlaid by said small groove provided in said slidable valve member.

5. A solenoid operated four port valve as set forth in claim 4 wherein said first and second pilot holes extending through the valve seat member have the same diameter, said diameter being somewhat smaller the width of each of said three oblong slots arranged in parallel.

6. A solenoid operated four port valve as set forth in claim 5 wherein said recessed portion provided in said slidable valve member is formed into a substantially rectangular configuration having a length measured along the sliding direction of said slidable valve member sufficient to cover either adjacent pair of said three slots and a width sufficient to cover the length of said three oblong slots in said valve seat member.

7. A solenoid operated four port valve as set forth in claim 6 wherein said small groove is provided to extend depthwisely along one corner of said substantially rectangular recessed portion in communication therewith.

8. A solenoid operated four port valve as set forth in claim 7 wherein assuming the width of said parallel arranged three slots to be $b$, the space between the three slots are selected to be $b$, the longitudinal measurement of the recessed portion of the slidable valve member is selected to be $3b$, the longitudinal measurement of the slidable valve member, from one outer edge to another thereof, is selected to be $5b$, and the arrangement of the pilot holes is so selected that said small groove overlies said first pilot holes when the slidable valve member is in its first position, and the groove overlies none of the pilot holes when the slidable valve member is in its second position of the operation.

* * * * *